(No Model.)
T. H. SPECHT & J. BROENEN.
WHEEL TIRE.
No. 457,569. Patented Aug. 11, 1891.
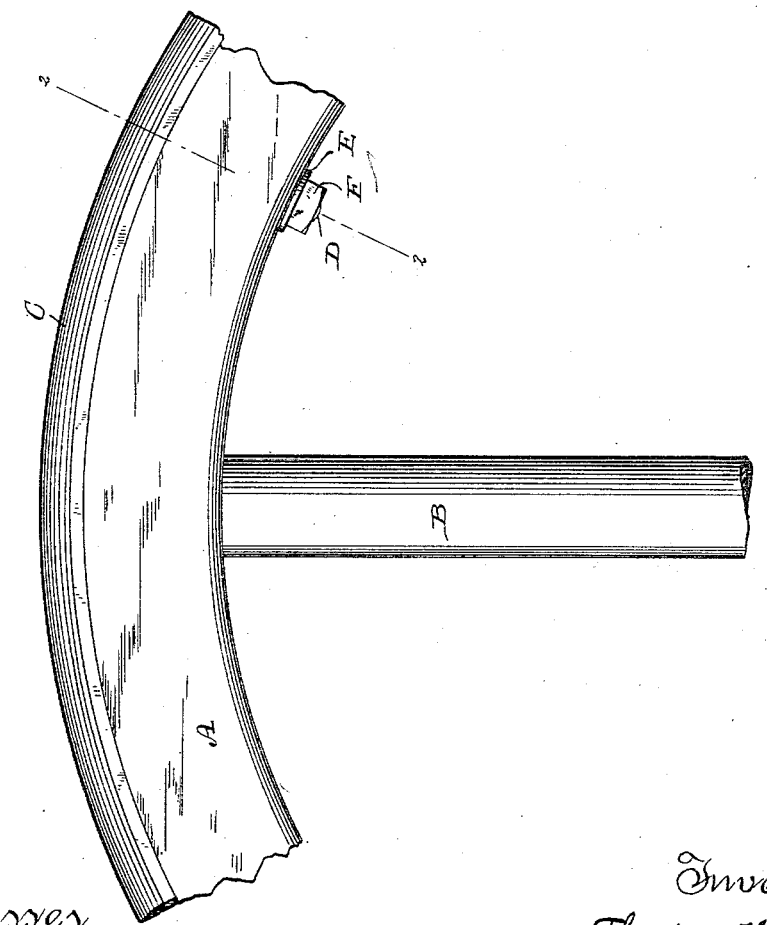
Witnesses
Geo. W. Young.
N. E. Oliphant.
Inventors:
Theodor H. Specht,
John Broenen,
By H. G. Underwood,
Attorney

UNITED STATES PATENT OFFICE.

THEODOR H. SPECHT AND JOHN BROENEN, OF MILWAUKEE, WISCONSIN.

WHEEL-TIRE.

SPECIFICATION forming part of Letters Patent No. 457,569, dated August 11, 1891.

Application filed January 17, 1891. Serial No. 378,081. (No model.)

*To all whom it may concern:*

Be it known that we, THEODOR H. SPECHT and JOHN BROENEN, citizens of the United States, and residents of Milwaukee, in the county of Milwaukee, and in the State of Wisconsin, have invented certain new and useful Improvements in Tires; and we do hereby declare that the following is a full, clear, and exact description thereof.

Our invention consists in certain peculiarities of construction, to be hereinafter described with reference to the accompanying drawings, and subsequently claimed.

In the drawings, Figure 1 represents a side elevation of a portion of a vehicle-wheel provided with a tire constructed according to our invention, and Fig. 2 a section on line 2 2 of the preceding figure.

Referring by letter to the drawings, A represents a portion of the wooden rim of an ordinary buggy or carriage wheel, B a spoke of the same, and C a portion of a metallic tire shrunk on said rim and made fast thereto by means of bolts D, washers E, and nuts F, as is usual in the art to which our invention relates. In the present instance the inner face of the tire C is flat and corresponds in width to that of the adjacent outer face of the wheel-rim, and from this rim the sides of said tire oblique outward in opposite directions to join an outer convex face, as best illustrated in Fig. 2, the greatest thickness of the aforesaid tire being in the center. The outer face of the tire being convex, the wheel will not throw mud like those having ordinary tires, and the oblique sides of said tire serve as fenders to protect the sides of the wheel-rim.

The increased thickness of our tire at the center adds to its strength and thereby stiffens the wheel without appearing any heavier than the ordinary tire, if as heavy, while at the same time the convexity of the tire causes stones and other loose obstructions in its path to be thrown aside, whereby the jar and strain due to such obstructions are avoided.

Another advantage of tires such as we have described lies in the fact that when a vehicle provided therewith is being turned across a car-track the wheels will not slide, as frequently occurs with vehicles having tires of the ordinary construction.

Having thus described our invention, what we claim as new, and desire to secure by Letters Patent, is—

The combination of the rim of a wooden vehicle-wheel with a solid metallic tire C, having a flat inner face equal to but not exceeding the width of the adjacent rim-face, obtuse-angle sides extending in opposite directions, and a convex outer face, the greatest thickness of said tire being at a point midway between its sides, substantially as set forth.

In testimony that we claim the foregoing we have hereunto set our hands, at Milwaukee, in the county of Milwaukee and State of Wisconsin, in the presence of two witnesses.

THEODOR H. SPECHT.
JOHN BROENEN.

Witnesses:
   N. E. OLIPHANT,
   WM. KLUG.